United States Patent
Rakhmailov

(12) 
(10) Patent No.: US 6,453,674 B1
(45) Date of Patent: Sep. 24, 2002

(54) METHOD OF OPERATION OF GAS TURBINE ENGINE

(75) Inventor: Anatoly Rakhmailov, Bataysk (RU)

(73) Assignee: ALM Development, Inc., Washington, DC (US)

( * ) Notice: Subject to any disclaimer, the term of this patent is extended or adjusted under 35 U.S.C. 154(b) by 0 days.

(21) Appl. No.: 09/930,062

(22) Filed: Aug. 14, 2001

Related U.S. Application Data

(62) Division of application No. 09/161,115, filed on Sep. 25, 1998, now Pat. No. 6,305,157.

(51) Int. Cl.[7] .................................................. F02C 7/18
(52) U.S. Cl. ........................................... 60/782; 60/806
(58) Field of Search .................... 60/39.02, 39.161, 60/39.19, 39.36, 39.75, 782, 806; 415/115, 116, 117

(56) References Cited

U.S. PATENT DOCUMENTS

| | | | | | |
|---|---|---|---|---|---|
| 2,410,259 A | * | 10/1946 | Birmann | ..................... | 60/39.19 |
| 3,418,808 A | * | 12/1968 | Rich | ......................... | 60/39.75 |
| 4,791,784 A | * | 12/1988 | Minardi et al. | ............ | 60/39.19 |

* cited by examiner

Primary Examiner—Louis J. Casaregola
(74) Attorney, Agent, or Firm—Hughes Hubbard & Reed, LLP; Ronald Abramson; Peter A. Sullivan

(57) ABSTRACT

A method of operation of a gas turbine engine having a turbine blade flow portion located between a blade inlet edge and outlet edge, and having a compressor to supply a compressed fluid flow comprising a substantial portion of the compressor fluid output along the outside surface of the blade flow portion, thus providing a thermal insulating boundary layer for the turbine blades over which flows heated fluid from the combustor. Heated fluid formed in the combustor flows without further cooling directly to the turbine blades, thereby reducing losses associated with cooling.

2 Claims, 4 Drawing Sheets

METHOD OF OPERATION OF GAS TURBINE ENGINE

This is a division of application Ser. No. 09/161,115, filed on Sep. 25, 1998 U.S. Pat. No. 6,305,157

The invention relates to the field of gas turbine engines, and more specifically, to an improved gas turbine engine using compressor fluid to maintain a thermal boundary layer between turbine blades and heated fluid from the combustor.

BACKGROUND OF THE INVENTION

A type of prior art gas turbine has a compressor, a fuel source, a source of air for combustion, a casing, and a combustor to prepare heated fluid from fuel and combustion air. The combustor has a combustion zone that is connected to the fuel source and the source for combustion air. It contains a cooling zone for cooling the resulting heated fluid before reaching the turbine. The combustor cooling zone is connected to the compressor. The heated fluid temperature fluctuates depending on operating conditions. In conventional gas turbine engines, these temperature fluctuations result in strong temperature-induced stresses imparted on the engine components.

In these prior art gas turbines, virtually the entire compressor fluid flow is directed to the combustor. Fluid heated in the combustor is cooled by the compressor fluid flow in the combustor cooling zone. This engine has a turbine rotor disk with blades that receive heated fluid from the combustor. The temperature of this heated fluid is quite high and, under certain conditions, the fluid can overheat the turbine rotor disk blades. To prevent such overheating, each blade has an interior channel that receives air from the compressor. As a result, part of the fluid coming from the compressor (about 3% to 5% of the total flow) is supplied to the interior channel of the blades to keep their temperature within design limits. One example of this gas turbine engine is disclosed in U.S. Pat. No. 3,826,084 to Branstrom. et al.

The heated fluid also has to be cooled after fuel combustion. Normally, this is done in the combustor, to which the major part of the fluid from the compressor would be admitted.

Thus, in this prior art gas turbine, substantially all of fluid coming from the compressor is supplied to the combustor cooling zone to cool the fluid before it enters the turbine. When fluid from the compressor is mixed with the heated fluid in the combustor cooling zone, about 3% to 5% of the fluid's energy is lost. Diverting about 3% of fluid from the compressor to the turbine rotor disk blades results in another 3% in losses. In addition, the combustor for this prior art gas turbine has to be made larger to accommodate the cooling zone.

SUMMARY OF THE INVENTION

It is an object of the invention to provide a gas turbine engine that would have a better efficiency and lower harmful emissions.

It is another object of the invention to reduce the cooling zone losses of the prior art combustor.

Another object of the invention is to provide a more compact gas turbine engine.

A further object of the invention is to prolong the life of the gas turbine engine.

The foregoing objects are accomplished through the design of a gas turbine engine having a turbine blade flow portion located between a blade inlet edge and outlet edge, and having a compressor to supply a fluid flow, comprising a substantial portion of compressor fluid output, along the outside surface of the blade flow portion, thus providing a thermal insulating boundary layer over which flows heated fluid from the combustor. Heated fluid formed in the combustor flows without further cooling directly to the turbine blades, thereby reducing losses associated with cooling.

Other objects and advantages of the invention will become apparent from the following detailed description of preferred embodiments and accompanying drawings.

DETAILED DESCRIPTION OF THE DRAWINGS

Figure 1:
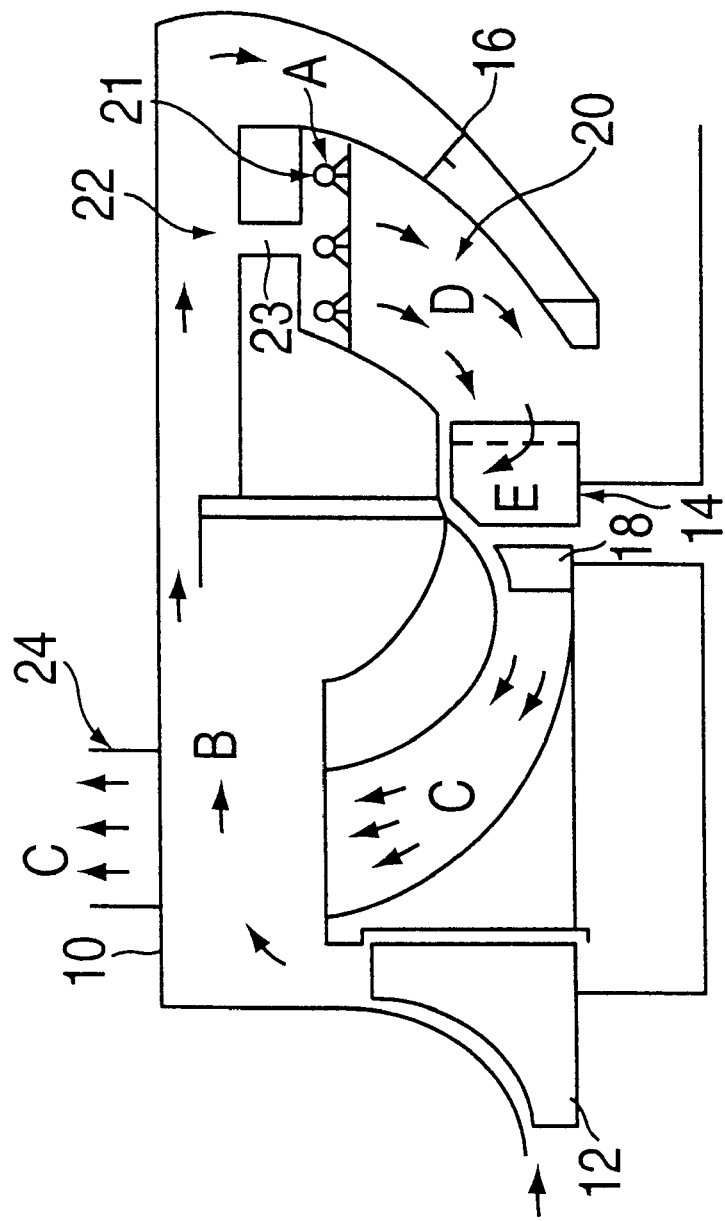
FIG. 1 shows a diagram of a gas turbine engine according to the invention.

In FIG. 1, a gas turbine engine has a casing 10, a compressor 12 for supplying a compressed fluid, a turbine rotor disk 14 mounted downstream of compressor 12, a combustor 16 to prepare heated fluid for the turbine and a compressor turbine rotor disk 18 for driving compressor 12. Turbine rotor disk 14 rotates in a direction opposite to that of compressor rotor disk 18. Fluid flows from turbine rotor disk 14 directly to the compressor turbine rotor disk 18. Combustor 16 has nozzles 21 to admit fuel supplied from a fuel source (not shown). Combustor 16 defines a combustion zone 20 that occupies substantially the entire interior space of the combustor 16. Combustion air is supplied in the direction shown schematically by arrow A to the inlet part of the combustor 16 where nozzles 21 are located.

Most of the fluid from compressor 12 is supplied to turbine rotor disk 14, bypassing combustor 16, as shown by arrows B, through passage 22 in casing 10. The range of fluid flowing directly to the turbine is between approximately 55% and 85% of the total fluid flow. Any flow substantially less than 55% would not achieve the desired cooling for the turbine blades and associated components, and a flow of substantially greater than 85% would introduce losses because it would lead to incomplete combustion in the combustor. This fluid flow is admitted to turbine rotor disk 14, envelops the turbine blades and goes to compressor turbine rotor disk 18 to drive compressor 12. Part of this fluid goes to combustor 16 as described below. Exhaust gases from compressor turbine rotor disk 18 are removed through an exhaust manifold 24 in the direction shown by arrows C.

Only that part of the total fluid that is used for fuel atomizing (about 25% of the entire quantity of the fluid from the compressor) is supplied to combustor 16 through a port 23. Combustor 16 does not have a cooling zone in combustor 16, and fluid goes from combustor 16 uncooled to turbine rotor disk 10 in the direction shown schematically by arrows D. The fluid moves as shown by arrows E both to cool the heated fluid that leaves combustor 16 and to protect the blades of the turbine rotor disk against damage.

Figure 2:
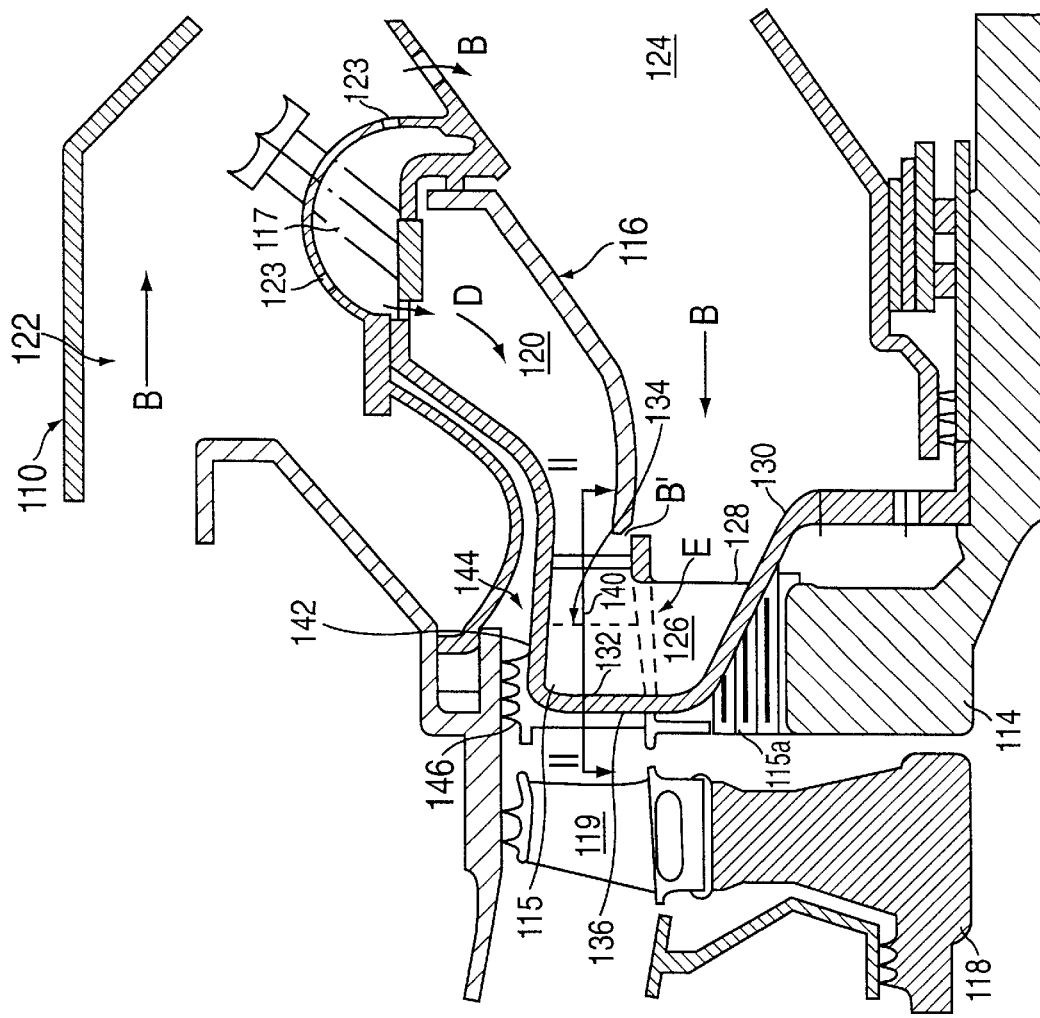
FIG. 2 shows a side elevation sectional view of a gas turbine engine according to the invention (the compressor is not shown)

Referring to FIG. 2, in which similar parts are shown at the same reference numerals as in FIG. 1 with addition of 100, a turbine rotor disk 114 has blades 115 mounted by means of a root portion 115a in the rotor disk and is located immediately downstream of combustor 116 to receive the heated fluid formed in combustion zone 120 as shown by arrow D. Combustor 116 also receives combustion air in the amount necessary as it is well known to those skilled in the art. Combustion air is supplied through a separate line not shown.

Organizing the supply of combustion air is well known to those skilled in the art and is not described in detail here. It should be noted, however, that air could be admitted tangentially to the prevailing direction of flow in the combustor (see arrows D in FIG. 1). This is a known method to impart a spin to the flow of heated fluid. This helps make the flow of the heated fluid compatible with the rotation of the compressor turbine rotor disk. Alternatively, angles of entry to the turbine rotor blades may be used to obtain a similar result. In that case, there will be no need to admit combustion air tangentially.

A compressor turbine rotor disk 118 is mounted downstream of turbine rotor disk 114 and has blades 119. A passage 122 connects the space between turbine rotor disk 114 and a compressor (not shown) in a zone 124, which is defined by the inner annular wall of combustor 116. The fluid from the compressor moves in a direction along arrow B and is admitted to the turbine rotor disk blades 115.

Figure 3:
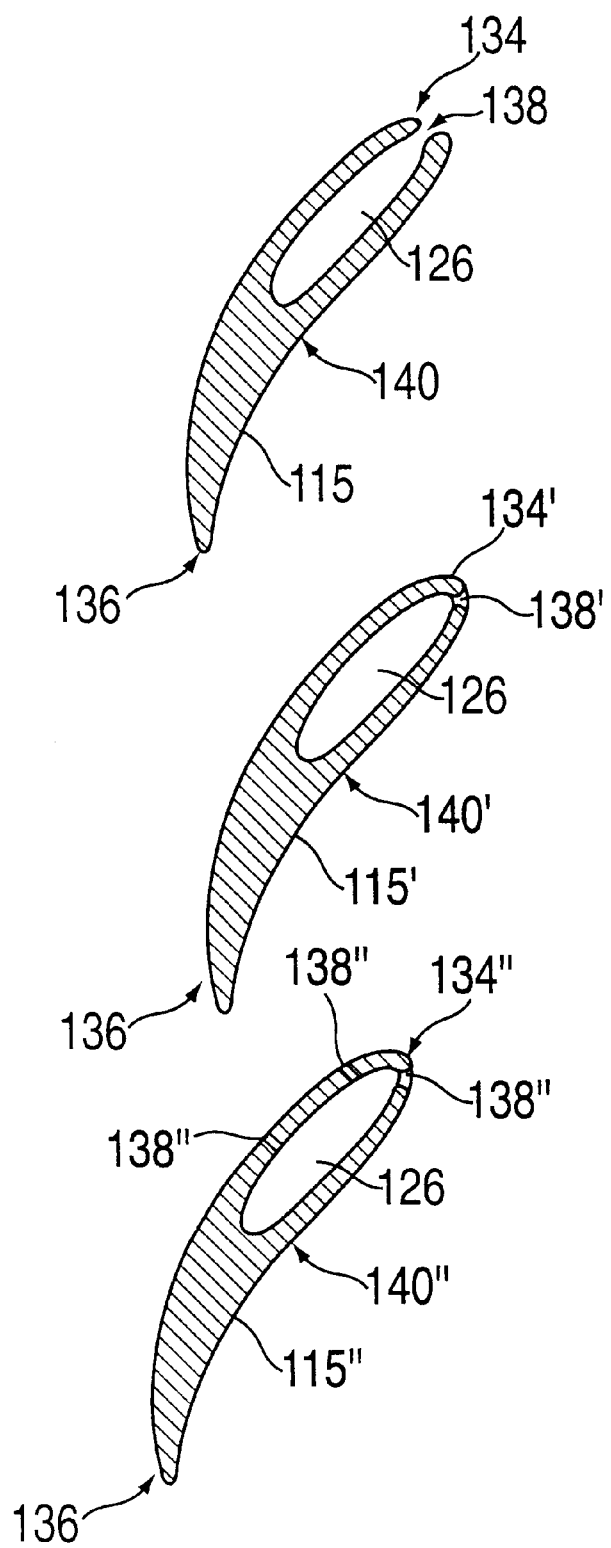
FIG. 3 shows various embodiments of a turbine rotor disk blade (a cross-sectional view taken along line II—II in FIG. 2.

In FIG. 3, blade 115 has an internal passage 126 with an inlet opening 128, a tapered portion 130, and a straight portion 132. The walls of internal passage 126 are positioned at an optimum angle of entry that assures a smooth incidence of the fluid flow upon the walls of the passage, such optimal angle of entry being readily ascertainable by those skilled in the art. Blade 115 has an inlet edge 134 on the side of combustor 116 and an outlet edge 136 on the opposite side. The inlet edge has either a fluid outlet slit 138, ports 138' arranged along the inlet edge, or a plurality of ports 138" arranged along several lines. Various outlets can be provided in the turbine rotor disk blades 15 such as multiple slits, rows of ports, and the like. Blades 115 of the turbine rotor disk may not have a detachable root portion and can be made integral with the rotor disk.

A portion 140 between the inlet edge and the outlet edge of blade 115 defines a blade flow portion along which the fluid from the compressor moves after leaving the straight portion 132 of internal passage 126. This fluid envelops flow portion 140 of blade 115, thus forming a layer of fluid over the blade surface and providing a thermal insulating layer against the heated fluid coming from the combustor 116. The heated fluid is formed in the combustor combustion zone 120 using fuel fed from a fuel source (not shown) through a pipe 117, and moves to blade 115 without being preliminarily cooled. When this heated fluid reaches the blade 115, it will move along blade flow portion 140 over the layer of the relatively cool fluid that is supplied from the compressor, and only partly mixes with it. This layer separation of hot and cool fluid protects the blade against overheating. As can be seen in FIG. 2, a part of the fluid from the compressor leaves internal passage 126 of blade 115, moves along arrow A and returns to the inner surface of a shroud 142 of blade 115. At the same time, a part of the fluid from space 124 upstream of turbine rotor disk 114 passes through a clearance between the edge of the inner annular wall of combustor 116 and the edge of blade 115 as shown by arrow B'. This fluid protects the remaining surfaces in the inter-blade space.

When the heated fluid leaves blades 115 of turbine rotor disk 114, it moves to blades 119 of compressor turbine rotor disk 118. It should be noted that the fluid from the compressor that envelops turbine blade 115 also moves to compression turbine blade 119. When the heated fluid and the fluid from the compressor reach the compressor turbine rotor disk, they both will have about the same temperature.

The cooling fluid fills an annular space 144. This fluid will move between the casing and labyrinth seals 146 to protect the inner surface of the casing in this area.

The description of this embodiment shows that there is no cooling zone in combustor 116. The absence of the cooling zone in combustor 116 means a smaller combustor size and eliminating cooling zone losses that occur in mixing the heated fluid with a cooler fluid. When the heated fluid moves along flow portions 140 of blades 114 over the fluid layer from the compressor, there is only incomplete mixing of the two fluids, so the losses in this zone are minimized. Because the compressor fluid is cooler, it has lower viscosity. This lower viscosity fluid moves along the blade surface and determines the boundary losses. According to principles of fluid mechanics, because the heated fluid, which is at a temperature of about 2,000K, has a higher viscosity, it is prevented from moving over the blade surface by the lower viscosity fluid. There is no direct contact between the heated fluid and the surface of the engine components, so these components do not experience thermally-induced stress to the same degree as prior art gas turbines. Moreover, the composition and temperature of the cooler fluid fed from the compressor—which does contact the blade material—reduces that fluid's corrosiveness to the blade material relative to the corrosiveness of heated fluid coming directly from the combustor. This prolongs blade life.

In addition to undergoing incomplete mixing, the heated fluid and the fluid from the compressor expand when they meet, decreasing their temperature. Consequently, the oxidation reactions downstream of the combustor will not be as intensive as in the prior art engines. This means that less $NO_x$ will be formed, and the engine according to the invention consequently will be less harmful to the environment.

When fluid is fed from the compressor to the turbine blades, it carries a large amount of energy. This fluid expands in the area between the inlet and outlet edges of the blades. In prior art engines, this fluid lost a part of its energy in the combustor cooling zone. These cooling losses are avoided in this invention. The work performed at this expansion is about one half the turbine power. The quantity of this fluid is larger than the quantity of the hot gases coming from the combustor, but it is cooler, which explains why the amount of work is only one half of the turbine power.

Figure 4:
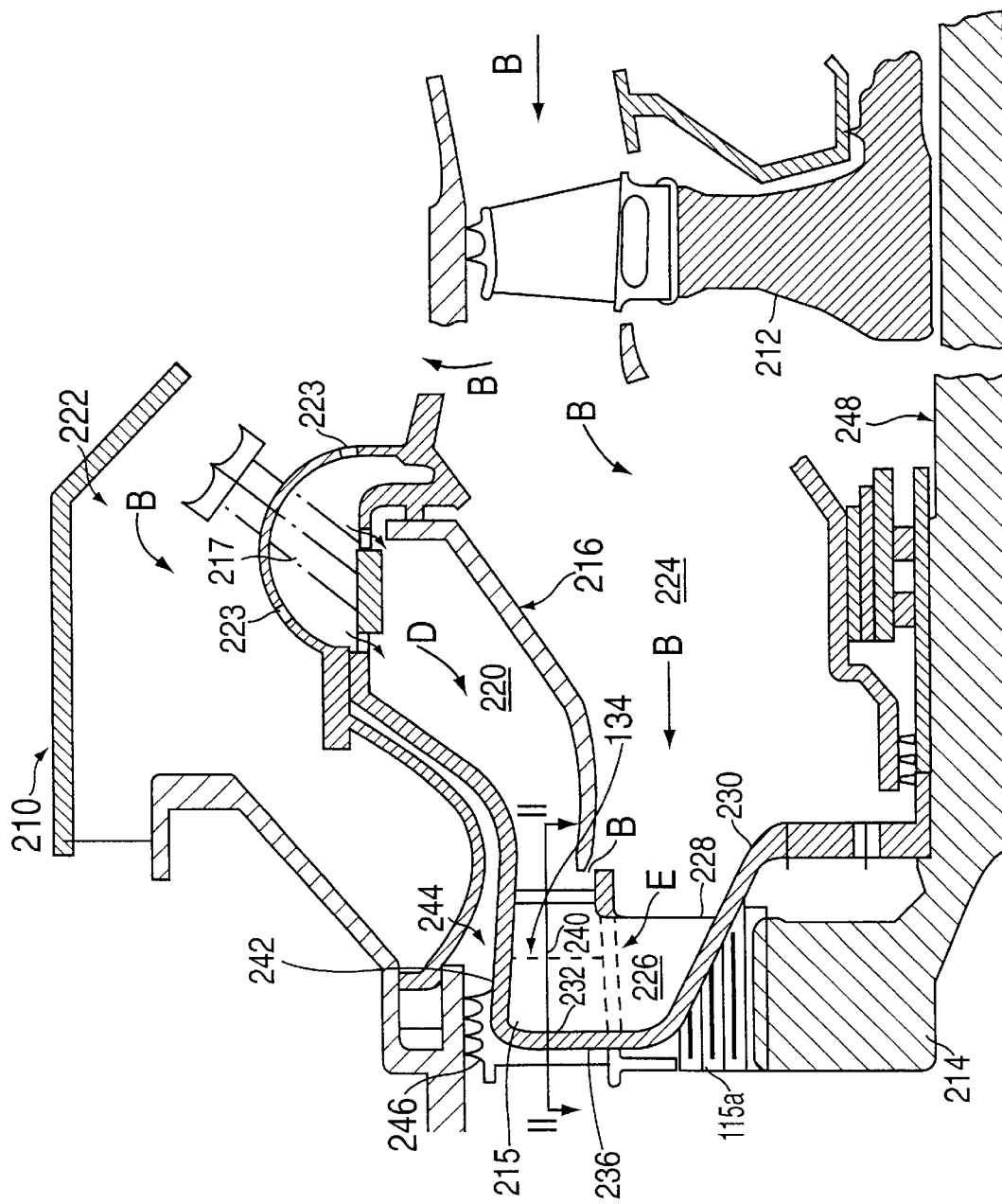
FIG. 4 shows another embodiment of a gas turbine engine according to the invention in a view similar to that depicted in FIG. 2 (the compressor is not shown).

In another embodiment shown in FIG. 4, where similar parts are shown at the same reference numerals as in FIG. 2, with the addition of 100, the only difference is that the gas turbine engine has one turbine rotor disk 214, and a compressor 212 is driven by a shaft 248. Otherwise, the design and operation of this embodiment are the same.

The preferred embodiment of the invention have been described above. It is, however, understood that various modifications and changes to the embodiments presented herein are possible without going beyond the spirit and scope of the invention defined in the attached claims.

I claim:

1. A method of operating a gas turbine engine having a compressor for producing a compressed fluid flow, a casing, a combustion zone in said casing, a power turbine rotor disk having blades, each of said blades comprising an external airfoil surface with a leading surface and a trailing surface, an inlet edge positioned downstream of said combustion zone, an outlet edge positioned immediately downstream of said inlet edge, a blade flow portion located adjacent trailing surface of said external airfoil surface and between said inlet edge and said outlet edge, and an internal passage with at least one opening to said external airfoil surface, said method comprising:

supplying said compressed fluid from said compressor to said internal passage and passing said compressed fluid through said at least one opening to said blade flow portion, said compressed fluid flow moving along said blade flow portion so as to create a thermal insulating boundary between said heated fluid and said trailing surface of said external airfoil surface;

supplying fuel and air for combustion to said combustion zone to prepare a heated fluid; and supplying said heated fluid from said combustion zone directly to said blade flow portion.

2. The method of claim 1, wherein said compressed fluid flow from said compressor supplied to said blade flow portion comprises between 55% and 85% of the total fluid flow from the compressor.

* * * * *

UNITED STATES PATENT AND TRADEMARK OFFICE
CERTIFICATE OF CORRECTION

PATENT NO.    : 6,453,674 B1
DATED         : September 24, 2002
INVENTOR(S)   : Rakhmailov It is certified that error appears in the above-identified patent and that said Letters Patent is hereby corrected as shown below:

<u>Column 1,</u>
Please replace lines 4-5 with the following:
-- This is a division of application Ser. No. 09/161,115, filed on Sep. 25, 1998, now issued as U.S. Pat. No. 6,305,157. This application cross-references three copending U.S. patent applications, each of which was filed on September 25, 1998, as U.S. Patent Application Serial No. 09/161,104, 09/161,114, and 09/161,170 respectively, each of which copending U.S. applications is incorporated herein by reference. --

Signed and Sealed this

First Day of April, 2003

JAMES E. ROGAN
*Director of the United States Patent and Trademark Office*